June 27, 1939.  V. POMERNACKI  2,163,962
AUTOMOBILE FOOT PEDAL SAFETY CONTROL
Filed Aug. 22, 1938
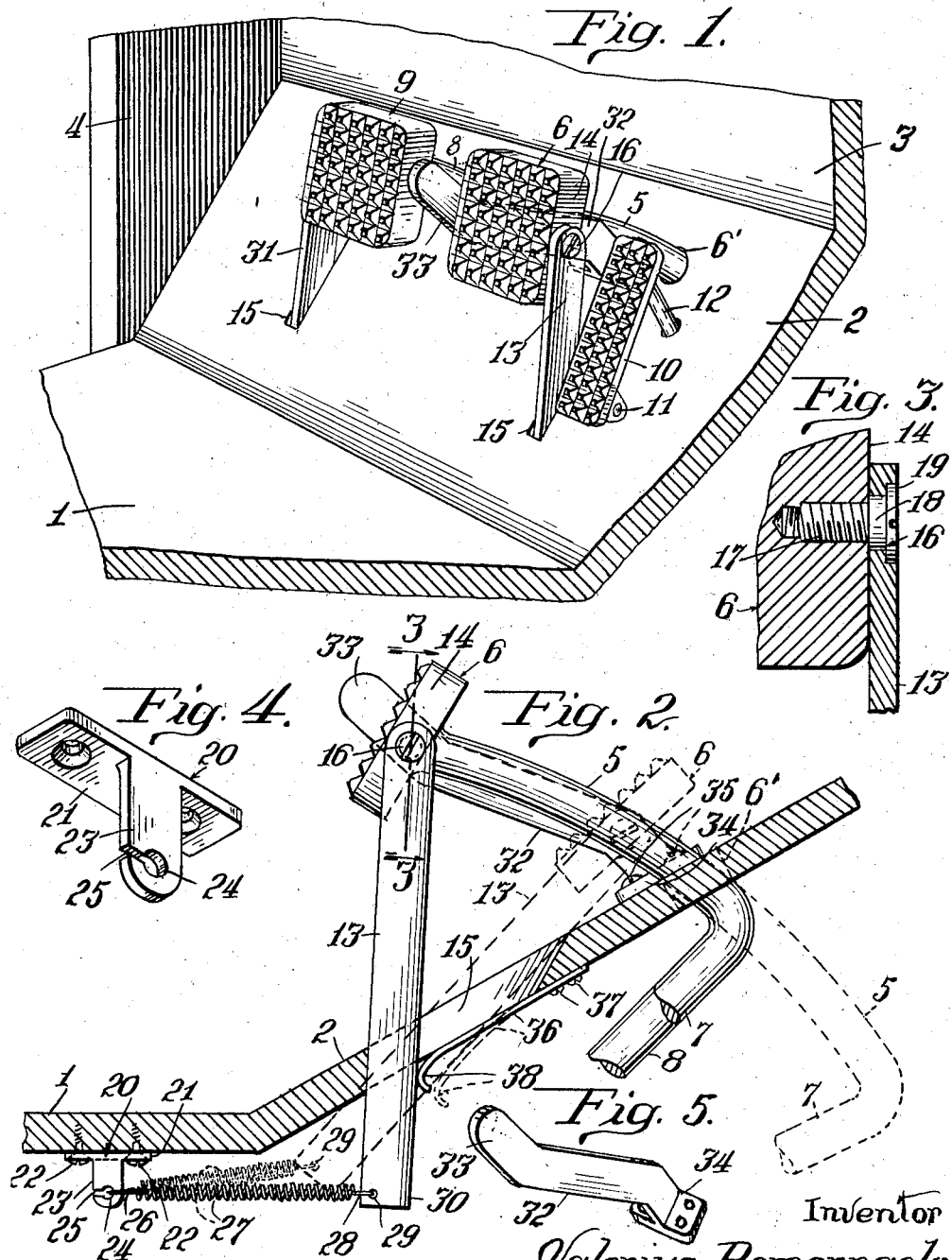
Inventor
Valerius Pomernacki
By Barnett & Truman
Attorneys Patented June 27, 1939

2,163,962

UNITED STATES PATENT OFFICE 2,163,962

AUTOMOBILE FOOT PEDAL SAFETY CONTROL

Valerius Pomernacki, Chicago, Ill.

Application August 22, 1938, Serial No. 226,021

10 Claims. (Cl. 74—566)

This invention relates to certain new and useful improvements in an automobile foot pedal safety control, and more particularly to improved means for automatically guiding the feet into proper position on the brake and clutch pedals by which the automobile is controlled so as to simplify driving and minimize accidents.

As is well known, the foot-operated clutch and brake levers of the ordinary automobile project upwardly through openings in the foot-board so that the pedals carried at the upper ends of these levers are positioned side by side and at a considerable distance above the foot-board when in their uppermost positions.

In the process of driving the car, the driver must intermittently shift his right foot from the accelerator pedal to the brake pedal, and back again, and since the accelerator pedal is usually positioned rather closely adjacent to the foot-board, while the brake pedal (when in its released or uppermost position) is at a considerably higher level, there is a possibility of catching the foot beneath the brake pedal. This is especially true when the driver is careless or inexperienced, or when the foot must be shifted quickly in a sudden emergency. Also, it is undesirable for the driver to "ride" the clutch, that is, to keep his foot constantly on the clutch pedal, and the better drivers will ordinarily rest the left foot on the foot-board adjacent the clutch pedal, or on the floor board at some location to the rear of the pedal. When it becomes necessary to suddenly replace the left foot on the clutch pedal, there is danger of catching this foot beneath the pedal. There is also the possibility of shifting one or the other of the feet laterally onto the wrong pedal. These mistakes in properly positioning the feet on the pedals are often the cause of accidents, and the present invention is designed to minimize this danger.

Briefly described, the present invention comprises guide plates secured to and movable with the pedals. Preferably, these guide plates are pivotally secured to the outer sides of the respective pedals and extend downwardly through openings in the foot-board, and suitable means are connected with the lower end portions of the guide plates beneath the foot board so as to maintain the guide plates in proper position and permit them to swing with the pedals. In addition, a guiding post is mounted on the foot board and projects upwardly and rearwardly between the pedals so as to properly separate the feet and maintain them on the respective pedals.

The principal object of this invention is to provide safety guide means of the type briefly described hereinabove and disclosed more in detail in the specifications which follow.

Another object is to provide an improved guide member attached to and movable with the pedal of a foot-operated control lever so as to automatically direct the foot into position on the pedal.

Another object is to provide an improved guide member fixedly positioned between the clutch and brake pedals for preventing lateral movement of a foot from one pedal to another.

Other objects and advantages of this invention will be more apparent from the following detailed description of one approved type of apparatus designed and operating according to the principles of this invention.

In the accompanying drawing:

Fig. 1 is a perspective view of a portion of the driver's compartment of an automobile showing the foot-operated control pedals with the improved safety devices applied thereto.

Fig. 2 is a partial vertical section taken in a plane between the accelerator and brake pedals and parallel to the longitudinal center line of the car.

Fig. 3 is an enlarged detail section taken substantially on the line 3—3 of Fig. 2.

Fig. 4 is a perspective vew of the spring-anchoring bracket.

Fig. 5 is a perspective view of the separating post.

In Fig. 1 is indicated a portion of the car structure comprising the floor board 1, foot-board 2, dash 3, and a portion of the left hand side wall, indicated at 4. The foot-operated controls are, as usual, mounted on and operate through the upwardly and forwardly inclined foot-board 2. The brake lever 5, which carries the brake pedal 6 at its upper end, extends downwardly and forwardly through an opening 6' in the foot board 2 and then extends rearwardly, as indicated at 7, and is pivoted about its center so that the pedal 6 will, when depressed, move substantially from the extreme upper position indicated in solid lines (Fig. 2) to the position indicated in dotted lines in the same figure. The clutch lever 8 carrying the brake pedal 9 is in all respects similar to the brake lever and pedal hereinabove described, and swings about the same axis. The brake and clutch pedals 6 and 9, respectively, are positioned side by side but spaced a short distance apart. The accelerator or gas-pedal 10 is located at the right of brake-pedal 6 and more closely adjacent the floor board 2. In the example here shown, pedal 10 is pivoted adjacent its rear end at 11 to the floor-board, and is connected near its upper forward end with the rod or lever 12 which controls the gas supply to the engine. The lever and pedal combinations as hereinabove described are old and common in the art, and it will be understood that the exact form, size and inclination of these pedals vary somewhat in different types of motorcars, but in general the relative arrangement is substantially as disclosed hereinabove.

According to the present invention, guides or deflecting members are provided to help direct the feet into proper position on the respective pedals 6 and 9. In the preferred example here shown, a guide plate or bar 13 is pivotally attached at its upper end to the outer side 14 of the brake pedal 6, that is, the side adjacent the accelerator 10. The lower end portion of bar 13 extends downwardly and is movable through a slot or opening 15 formed in footboard 2. It is desirable that the upper end of plate 13 be substantially flush with the upper surface of pedal 6, and there should be no projecting portions that might catch the foot as it is slid upwardly along guide plate 13 onto the upper surface of the pedal. One approved way of attaching the plate to the pedal is indicated more in detail in Fig. 3, a shouldered screw-bolt 16 being threaded at 17 into the pedal 6 so that the smaller shouldered portion 18 engages the side of the pedal, and the larger shouldered outer end portion 19 of the bolt is suitably counter-sunk into an opening provided therefor in the upper portion of plate 13 so that there will be no projecting portion that might be engaged by the foot. The guide plate 13 will pivot freely on the shouldered head portion of bolt 16.

A suitable anchoring bracket 20 (see Figs. 2 and 4) is mounted on the lower face of either the floor-board 1 or foot-board 2 rearwardly of the guide plate 13. This bracket may comprise a suitable base plate 21 secured to the footboard by screws 22, a bracket arm 23 extending downwardly from base plate 21 and being provided with an opening 24 from which leads a slot 25 to permit the ready attachment of the ring or hook 26 at the rear end of a tension spring 27. The other end of spring 27 is provided with an eye or hook 28 engaged in an opening 29 formed in the lower end portion 30 of guide plate 13 which projects beneath the foot-board 2. Spring 27 functions to hold the guide plate 13 rearwardly at its lower end (that is, as shown in solid lines in Figs. 1 and 2), while at the same time the guide plate is permitted to move longitudinally and tilt within slot 15 as it moves to the dotted line position shown in Fig. 2.

A second guide plate 31 and associated parts, which may be in all respects the same as the guide plate 13 and its assembly as hereinabove described, is attached to the left hand side of clutch pedal 9 and moves and functions in a similar manner.

In addition, a guide or separating post 32 is preferably provided between the two pedals 6 and 9. The upper end portion 33 of this post projects centrally between and a substantial distance above the upper surfaces of the pedals 6 and 9 when these pedals are in their extreme upper position. When, for example, the right foot is guided by plate 13 onto brake pedal 6, it will, if moved too far to the left, engage the post 33, thus preventing the foot from moving off of pedal 6 and perhaps onto pedal 9. Obviously the guide post functions in the same manner to hold the left foot on pedal 9. The guide post 32 may be provided with a base plate 34 which is fixedly mounted on the upper surface of foot-board 2, as by screws 35. The post 32 and base plate 34 may be given a variety of shapes in accordance with the location and arrangement of the controls of the particular car on which the post is installed. In some cars, a starter button is positioned between the clutch and brake pedals, in which case the post 32 should be inclined and the base 34 positioned forwardly so as to not interfere with the starter button. In the typical example here shown, the post 32 is angular, first projecting rearwardly from the supporting base 34 and then extending in a more vertical direction between the pedals 6 and 9. Obviously, the longer dimension of base plate 34 could extend longitudinally of the car instead of laterally (as indicated in Fig. 5).

In operation, when the right foot is lifted from the accelerator 10 to apply the brake, if the foot is not elevated far enough it will engage guide plate 13 and can be slid upwardly along this plate until the foot passes on to the pedal 6. If the foot is moved over too far to the left, it will engage part 33 of post 32, thus assuring that the foot remains on the brake pedal. Similarly, if the left foot is allowed to rest on foot-board 2 at the left of the clutch pedal, it will be guided upwardly by plate 31 onto the surface of pedal 9. In practice, the driver may learn to rely to some extent on the guide plates 13 and 31, so that in an emergency both feet can be lifted and drawn toward one another, and when the feet are positioned on the pedals the intermediate post 32 will separate the feet.

Some of the advantages of this invention can be obtained by the use of either the guide plate 13 or the guide plate 31 alone, and similarly some advantages can be obtained from the use of guide post 32 alone, but the cooperating assembly of these three guides is preferable, as hereinabove shown and described.

As an additional feature a flat spring 36, wide enough to cover the slot 15 in the foot-board 2, can be attached to the under surface of the foot board at its forward end, as by screws 37. The rear downwardly curved end 38 of this spring engages the edge of guide-plate 13, and the spring will yield to permit the guide-plate to move to the dotted line position of Fig. 2. This spring serves to normally close the slot 15. Alternatively, a narrower spring of this type could be positioned within the slot 15, preferably near the top of the slot. It will be noted that this spring 36 will function to hold the guide-plate rearwardly, and in some installations the spring 27 might be omitted if spring 36 is used.

I claim:

1. In combination with a foot-operated control-lever of an automobile, the foot-board of the automobile formed with an opening through which the lever movably projects, and the pedal at the upper end of the lever, a guide-plate secured adjacent its upper end to a side edge portion of the pedal and extending downwardly and movable through an opening in the foot-board.

2. In combination with a foot-operated control-lever of an automobile, the foot-board of the automobile formed with an opening through which the lever movably projects, and the pedal at the upper end of the lever, a guide plate pivotally secured adjacent its upper end to one side edge portion of the pedal and extending downwardly and movable through an opening in the foot-board, said last mentioned opening being spaced rearwardly from the opening through which the lever moves.

3. In combination with a foot-operated control-lever of an automobile, the foot-board of the automobile formed with an opening through which the lever movably projects, and the pedal at the upper end of the lever, a guide plate pivotally secured adjacent its upper end to one side edge portion of the pedal and extending downwardly and movable through an opening in the foot-board, said last mentioned opening being spaced rearwardly from the opening through which the lever moves, and means for holding rearwardly the portion of the guide-plate beneath the foot-board while permitting the upper end portion of the guide-plate to swing forwardly with the pedal.

4. In combination with a foot-operated control-lever of an automobile, the foot-board of the automobile formed with an opening through which the lever movably projects, and the pedal at the upper end of the lever, a guide plate pivotally secured adjacent its upper end to one side edge portion of the pedal and extending downwardly and movable through an opening in the foot-board, said last mentioned opening being spaced rearwardly from the opening through which the lever moves, and means for holding rearwardly the portion of the guide-plate beneath the foot-board while permitting the upper end portion of the guide-plate to swing forwardly with the pedal, said means comprising an anchoring bracket mounted below the foot-board, and a tension spring secured at its ends to the bracket and lower end portion of the guide-plate respectively.

5. A means for guiding the foot onto the pedal of a foot-operated control lever on an automobile, said means comprising a guide-plate adapted to be secured at its upper end to a side edge portion of the pedal so as to project downwardly and be movable through the foot-board of the automobile.

6. A means for guiding the foot onto the pedal of a foot-operated control lever on an automobile, said means comprising a guide-plate, means for pivotally securing the upper end portion of the guide-plate to one side edge portion of the pedal, with the guide-plate extending downwardly through the foot-board, and means for movably securing the lower end portion of the guide-plate to the lower side of the foot-board.

7. A means for guiding the foot onto the pedal of a foot-operated control lever on an automobile, said means comprising a guide-plate, means for pivotally securing the upper end portion of the guide-plate to one side edge portion of the pedal, with the guide-plate extending downwardly through the foot-board, an anchoring bracket adapted to be mounted below the foot-board rearwardly of the guide-plate, and a tension spring secured at its respective ends to the bracket and lower end portion of the guide-plate.

8. In combination with a foot-operated control lever of an automobile, the foot-board of the automobile formed with an opening through which the lever movably projects, and the pedal at the upper end of the lever, and a guide-plate pivotally secured adjacent its upper end to one side of the pedal and extending downwardly and movable through an opening in the foot-board, said last-mentioned opening being spaced rearwardly from the opening through which the lever moves, and means for holding rearwardly the portion of the guide-plate beneath the foot-board, while permitting the upper end portion of the guide-plate to swing forwardly with the pedal.

9. In combination with the foot-operated clutch and brake levers of an automobile, the foot-board of the automobile provided with openings through which the levers movably project, and the pedals at the upper ends of the levers positioned side by side, and similar guide-plates pivotally secured adjacent their upper ends to the outer sides of the respective pedals, each guide-plate projecting downwardly and rearwardly of the pedals and movable through an opening in the foot-board.

10. In combination with a foot-operated control-lever of an automobile, the foot-board of the automobile formed with an opening through which the lever movably projects, and the pedal at the upper end of the lever, a guide plate pivotally secured adjacent its upper end to one side edge portion of the pedal and extending downwardly and movable through an opening in the foot-board, said last mentioned opening being spaced rearwardly from the opening through which the lever moves, and means for holding rearwardly the portion of the guide-plate beneath the foot-board while permitting the upper end portion of the guide-plate to swing forwardly with the pedal, said means comprising a spring anchored to the foot board and extending downwardly and rearwardly at the opening to engage the lower portion of the guide plate to hold the latter rearwardly and top upwardly but to permit the guide plate to move downwardly and forwardly with the control pedal and lever.

VALERIUS POMERNACKI.